United States Patent
Jääskeläinen et al.

(10) Patent No.: US 6,300,420 B1
(45) Date of Patent: *Oct. 9, 2001

(54) POLYPROPYLENE COMPOSITION WITH BROAD MWD

(75) Inventors: Pirjo Jääskeläinen, Porvoo; Amir Karbasi; Bo Malm, both of Espoo; Päivi Pitkänen, Halkia, all of (FI)

(73) Assignee: Borealis A/S, Lyungby (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,210
(22) PCT Filed: Oct. 10, 1995
(86) PCT No.: PCT/FI95/00558
§ 371 Date: May 12, 1997
§ 102(e) Date: May 12, 1997
(87) PCT Pub. No.: WO96/11216
PCT Pub. Date: Apr. 18, 1996

(30) Foreign Application Priority Data

Oct. 11, 1994 (FI) ........................................ 944761

(51) Int. Cl.⁷ ............................ C08L 23/14; C08L 255/02
(52) U.S. Cl. ............................ 525/240; 525/322; 525/323
(58) Field of Search .................................. 525/322, 323, 525/240

(56) References Cited

U.S. PATENT DOCUMENTS

| | | | |
|---|---|---|---|
| 4,784,983 | * 11/1988 | Mao et al. ........................ | 502/111 |
| 4,950,720 | 8/1990 | Randall, Jr. et al. ............... | 525/322 |
| 5,140,062 | 8/1992 | Chiba et al. ........................ | 525/53 |
| 5,218,052 | * 6/1993 | Cohen et al. ...................... | 525/240 |
| 5,571,585 | * 11/1996 | Yoshida et al. .................. | 428/36.91 |
| 5,962,595 | * 10/1999 | Dolle et al. ...................... | 525/322 |

FOREIGN PATENT DOCUMENTS

A2 0498603   8/1992   (EP) .
A2 0573862  12/1993   (EP) .
WO 9426794  11/1994   (WO) .

OTHER PUBLICATIONS

Derwent database, Acc–No.: 1982–14046E, Patent Family citations for US 5,539,067.*

* cited by examiner

*Primary Examiner*—Peter Szekely
(74) *Attorney, Agent, or Firm*—Birch, Stewart, Kolasch & Birch, LLP

(57) ABSTRACT

The invention relates to a copolymer composition prepared from copolymers of propene and α-olefin having 2 to 12 carbon atoms, having high molecular weight, a broad molecular weight distribution and an improved comonomer distribution. The invention relates also to a process for producing the composition and the use of the composition in pipes, fittings, profiles, films and foams. The composition is a so-called reactor mixture of copolymers of said monomers comprising a first copolymer having a higher molecular weight, an α-olefin content of 3 to 10 wt. % and a melt flow rate $MFR_2$ of 0,005 to 0,8, and a second copolymer having a lower molecular weight, thus the final composition has a comonomer content of 2 to 10 wt. %, a melt flow rate $MFR_2$ of 0,05 to 2,5 wt. %, a melt flow ratio $MFR_{10}/MFR_2$ of 6 to 15, and the split of the copolymers in the composition between the higher molecular weight copolymer and the lower molecular weight copolymer is from 40/60 to 70/30.

16 Claims, 2 Drawing Sheets

POLYPROPYLENE COMPOSITION WITH BROAD MWD

Polypropylene copolymer has many characteristics which makes it desirable for applications ranging from food packaging (film, bottle) to more demanding applications like pipes, fittings, foams etc.

Polypropylene as piping material is mainly used in non-pressure applications (pipe and fittings) and profiles. There is a small volume used for pressure pipe, mainly hot water and industrial pipes. The good thermal resistance of polypropylene compared to other polyolefins is utilized for the pipe applications. All three main types of propylene polymer, i.e. homopolymers, random copolymers and block copolymers are used. Homopolymers give the pipe good rigidity but the impact and creep properties are not very good. The block copolymers give good impact properties but the creep properties are like homopolymers due to the homopolymer matrix. Propylene ethylene random copolymers are used for pressure pipe applications for hot water and industrial pipes. That is due to their improved creep resistance compared to propylene homopolymers and block copolymers.

The propylene-ethylene random copolymers for pressure pipes are today produced with high yield Ziegler-Natta catalysts in processes (bulk or gas phase) giving a material having a relatively narrow molecular weight distribution (MWD=$M_w/nM_n$) of about 5. The molecular weight ($M_w$) of the pipe material with melt flow rate ($MFR_2$) of 0.2–0.5 is about 1000000. This high molecular weight and the narrow MWD cause problems in compounding and extrusion of pipes. The processability of such materials is difficult due to the low shear sensitivity causing unwanted degradation of the material and melt fracture, which is seen as uneven surface and thickness variations of the pipes. In addition the conventional propylene random copolymer pipe materials produced in one phase have not strength enough for the short and long term properties (notch resistance and creep) needed for good pressure pipes.

The processability of the conventional propylene random copolymers can be improved by broadening the MWD using multi-stage polymerization process. In multi-stage polymerization the MWD of polymer can be broadened by producing different molecular weight polymers in each stage. The MWD of polymer becomes broader when lower molecular weight is reactor-blended into the higher molecular weight polymer adjusting the final MFR by choosing the right molecular weight and reactor split in each stage. The molecular weight of polymer in each step could be controlled by hydrogen which acts as a chain transfer agent. Reactor temperature may be also used for controlling the molecular weight of polymer in each step. Multi-stage polymerization is disclosed e.g. in patent application WO 91 014 718.

Figure 1:
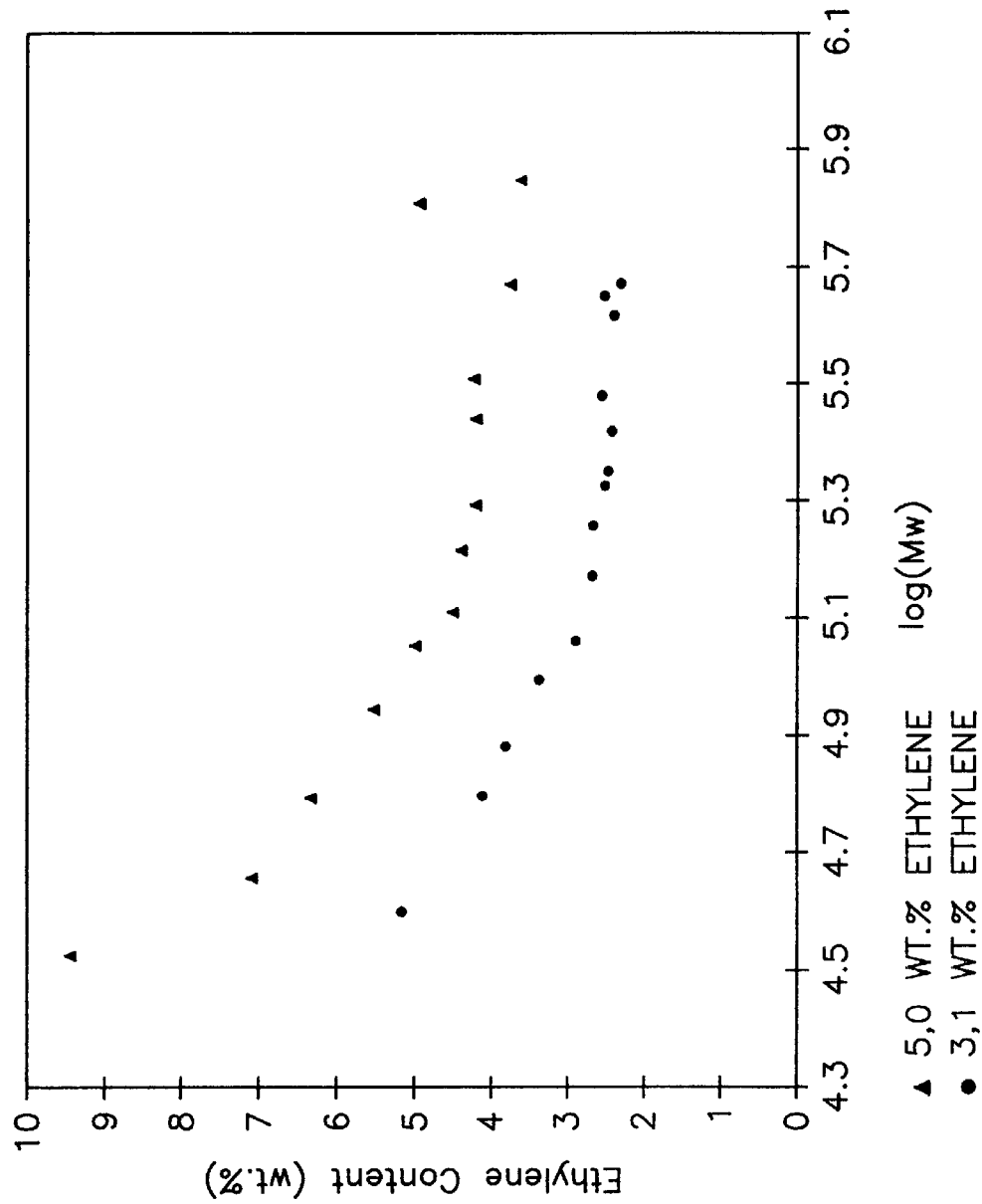

It has been recognised that high yield Ziegler-Natta catalysts give an uneven ethylene comonomer distribution to propylene random copolymers. It has been confirmed by fractionation methods that the high molecular weight chains content less ethylene than the low molecular weight chains (FIG. 1). When the low molecular chains have a high ethylene content the solubility is also increased. This gives particulary a great problem when the polymerisation is carried out in a hydrocarbon diluent. Low molecular weight fraction affects negatively the taste and odour of the pipe materials.

When the processability is improved by producing broader MWD propylene random copolymer, also the amount of low molecular fraction is increased if the comonomer feeds are the same in each stage. The taste and odour are affected.

For these reasons several polypropylene producers are producing the pipe material in a one-stage slurry process with $TiCl_3$ catalysts. In a slurry process the molecular weight distribution of polypropylene is broader, but the yield are lower and the reactor diluent solubility increases when the needed amount of comonomer, e.g. ethylene or butene-1, is increased. Also the comonomer distribution is usually better in a slurry process with $TiCl_3$ catalysts than with high yield catalysts.

This invention describes especially the production of propylene random copolymer pipe materials with the similar or even better properties than the material produced with $TiCl_3$-catalyst in a slurry process but with improved production economy. By using the concept invented with high yield $TiCl_4$-catalyst it is possible to produce pipe material having improved mechanical and pipe properties and also a good extrudability. The improved strength properties of the material come from a very high molecular weight fraction of Mw=2,000,000–4,000,000 ($MFR_2$=0.01–0.08) and an improved comonomer distribution together with a broad molecular weight distribution.

The invented concept is based on the idea of producing a broad MWD and a high molecular weight propylene random copolymer and improved comonomer distribution using high yield catalysts in two or several reactors at different reaction conditions. The comonomers incorporated in long chains as described in this invention destroy the regularity of the chains leading to the more homogenous distribution of the essential tie-chains and entanglements needed for creep properties and toughness in pipe materials.

The problem with the uneven comonomer distribution with high yield $TiCl_4$-catalysts is solved in a way that the amount of comonomer is split between the reactors. To the reactor where the high molecular weight propylene polymer is produced is fed more comonomer than to the reactor where the low molecular PP is produced. Higher amounts of comonomer can be fed because the solubility of the high molecular weight polymer is lower. The final comonomer content is adjusted by controlling the comonomer feeds into the reactors. In this way produced propylene copolymers have a more even comonomer distribution than the conventional propylene random copolymers produced with high yield $TiCl_4$-catalysts.

The product is a copolymer of propylene and at least one 2–12 C alpha olefin or their mixture, preferably especially 2–6 C alpha olefin, containing 2.0–10.0 w-%, preferably 3.0–6.0 w-% of comonomer, and having a melt flow rate (MFR) of 0.05–2.5 g/10 min (2.16 kg load), preferably 0.1–0.5 g/min (2.16 kg load) a flow rate ratio, MFR (10 kg load)/MPR (2.16 kg load) of > or =15–40, preferably MFR (10 kg load)/MFR (2.16 kg load)=16–26, and a MWD of 6–15.

The product is a reactor blend with a broad MWD comprising of two different molecular weight copolymer matrices. The high molecular weight matrix is produced in one reactor and the lower molecular weight matrix in the other reactor or reactors. The comonomer concentration in the reactor where the higher molecular weight copolymer is produced is higher than the comonomer concentration in the other reactor or reactors. Therefore the copolymer is a reactor blend of A and B:

A) 40–70 w-% produced in the stage where the higher molecular weight matrix is produced with a comonomer content of 3–10 w-%, preferably 4–6 w-%, B) 60–30 w-% produced in the stage or stages where the lower molecular weight matrix is produced with comonomer content of 2–6 w-%, preferably 2–3 w-%.

Hydrogen and/or polymerisation temperature are used to control the molecular weights together with the catalyst composition. This copolymer can be produced in a multistage polymerisation process having at least two reactors operating in series. Different combination of polymerisation reactors such as gas phase-gas phase, slurry-slurry, bulk-gas phase, bulk-bulk, etc can be applied.

All kind of stereoregular, high yield Ziegler-Natta catalysts can be used in the polymerisation. The catalysts can be prepolymerised, for example with ethylene or propylene, but there is not any limitation to use unprepolymerized catalyst either. All kinds of catalyst compositions with different external donors can be used.

The comonomer in the propylene copolymer can be ethylene, butene-1, hexene-1, 4-methyl-1-pentene, octene-1 and decene-1 or combinations of them.

The broadness of the molecular weight distribution can be measured by the flow rate ratio (FRR=$MFR_{10}$/$MFR_2$), gel permeation chromatography (GPC) or by Theological measurements. The rheological parameters, like polydispersity index (PI), shear thinning index (SHI) and melt elasticity index indicate the broadness of the molecular weight distribution of the polymer. The higher the values are the broader the MWD is.

Figure 2:
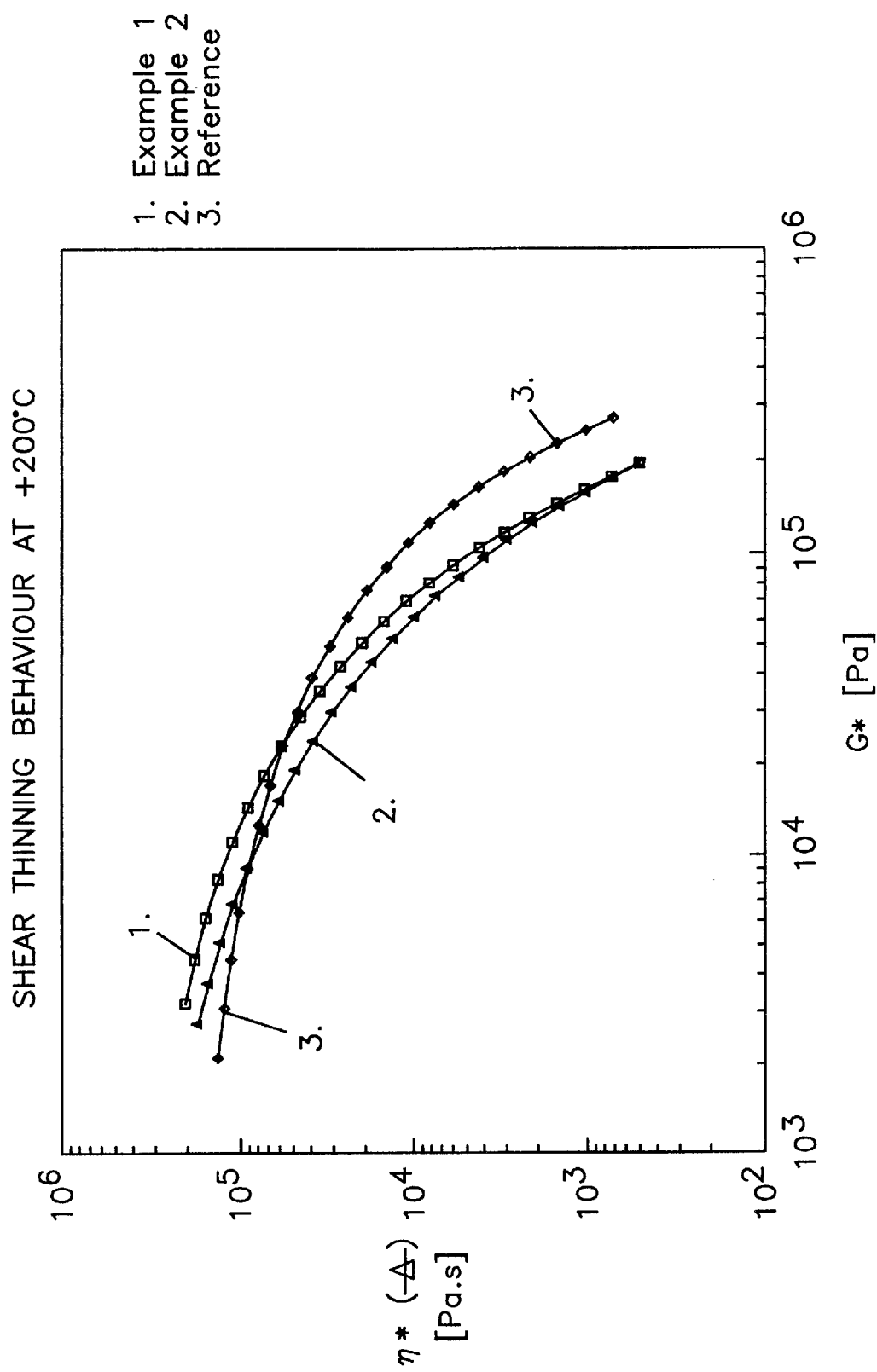

In this way (when examples 1–4 are compared to the reference material) produced high molecular weight propylene random copolymer pipe material with broad MWD and improved comonomer distribution has good extrudability without melt fracture. That because of a more pronounced shear thinning (SHI) behaviour (FIG. 2 and Table). The material has also high melt elasticity giving an improved melt strength. The comparative example 1 shows that even a very high molecular weight material with broad MWD can be extruded without difficulties.

The stiffness of this material is higher than that for materials produced with about the same comonomer content in several reactors or in only one reactor without loosing the impact. That is seen best when comparing the reference material and the Comparative example 1 to Example 4 which both are produced in the same conditions but with different ethylene feed splits. The entanglements and tiechains in the material give the material better pipe properties especially slow crack properties measured by constant tensile load in an ESCR (environmental stress cracking resistance) test under load. The invented copolymers give also longer time to failure at same hoop stress levels in standard pipe pressure tests than the conventionally produced random pipe material (this is also seen when examples 1 to 4 are comparewd to comparative wxample 1 and to the reference).

By using the same concept broad MWD random PP copolymer for blow moulding, film and fibre applications can be produced where good mechanical properties and improved comonomer distribution are needed.

Polymerization
Process Description

The process includes one 100 l loop reactor, and one 2 m³ stirred fluidized bed reactor (GPR) operated in series. Catalyst is introduced in suitable amounts into the first reactor in a very minor portion of an inert diluent. The catalyst is prepolymerized (ratio monomer/catalyst 3–7 g/1 g). Cocatalyst and external donor are fed into the first reactor. Hydrogen is used to control molecular weight of polymer. The loop reactor's product is transferred into the flash tank where unreacted liquid monomer is separated and then introduced to the GPR. The final product is collected after degassing and catalyst deactivation.

Catalyst System $MgCl_2$-supported alkoxysilane modified $TiCl_4$ as a catalyst, like described in patents FI 70028, or FI 86472, or FI 862459, or U.S. Pat. No. 4,784,983. Triethyl aluminum alkyl (TEA) a cocatalyst. External donor cyclohexylmethyl dimethoxy silane (CHMMS) or dicyclo-pentyl dimethoxy silane (DCPDMS).

EXAMPLES

Polymerization Conditions

Broad propylene-ethylene random copolymers were produced in pilot reactors by producing the high molecular weight copolymer in liquid propylene in the loop reactor and a lower molecular weight copolymer in GPR.

The polymerization temperature used in the examples was 70° C. The production rate was 6 kg/h for the loop reactor and 4 kg/h for the GPR, which means a production split of 60/40.

Example 1

The material was produced using a prepolymerized $MgCl_2$-supported $TiCl_4$ (patent FI 70028 or FI 86472). Cocatalyst was TEA and external donor CHMMS.

The following materials were produced in the loop and in the GPR, all the measured values are from powder samples:

|  | $MFR_2$ | Ethylene, w % |
|---|---|---|
| loop | 0.02 (1) | 3.7 |
| GPR | 20 | 2.2 (2) |
| final | 0.21 | 3.1 |

(1) $MFR_{10}$ was measured from the loop product, $MFR_2$ is calculated from this using an experimentally determined constant (16).

(2) MFR of the GPR product is estimated using the MFR of the loop product and the production split. The ethylene content of the product from GPR is estimated according to the ethylene content of the loop product and the final product.

Example 2

As example 1, but different catalyst (U.S. Pat. No. 4,784,983)) was used.

The following materials were produced in the loop and in the GPR, all the measured values are from powder samples:

|  | $MFR_2$ | Ethylene, w % |
|---|---|---|
| loop | 0.02 (1) | 4.0 |
| GPR | 40 | 3.0 (2) |
| final | 0.34 | 3.6 |

(1) $MFR_{10}$ was measured from the loop product, $MFR_2$ is calculated from this using an experimentally determined constant.

(2) MFR of the GPR product is estimated using the MFR of the loop product and the production split. The ethylene content of the product from GPR is estimated according to the ethylene content of the loop product and the final product.

Example 3

As example 1, but the catalyst like in patent FI 862459

The following materials were produced in the loop and in the GPR, all the measured values are from powder samples:

|  | $MFR_2$ | Ethylene, w % |
|---|---|---|
| loop | 0.02 (1) | 4.0 |
| GPR | 30 | 2.0 (2) |
| final | 0.25 | 3.2 |

Note 1. $MFR_{10}$ was measured from the loop product, $MFR_2$ is calculated from this using an experimentally determined constant.

Note 2. MFR of the GPR product is estimated using the MFR of the loop product and the production split. The ethylene content of the product from GPR is estimated according to the ethylene content of the loop product and the final product.

Example 4

Like example 1, but external donor DCPDMS was used.

The following materials were produced in the loop and in the GPR, all the measured values are from powder samples:

|  | $MFR_2$ | Ethylene, w % |
|---|---|---|
| loop | 0.03 (1) | 4.0 |
| GPR | 20 | 2.0 (2) |
| final | 0.30 | 3.2 |

(1) $MFR_{10}$ was measured from the loop product, $MFR_2$ is calculated from this using an experimentally determined constant (16).

(2) MFR of the GPR product is estimated using the MFR of the loop product and the production split. The ethylene content of the product from GPR is estimated according to the ethylene content of the loop product and the final product.

Comparable Example 1

Like example 4, but only a small difference between ethylene content in the loop and GPR.

The following materials were produced in the loop and in the GPR, all the measured values are from powder samples:

|  | $MFR_2$ | Ethylene, w % |
|---|---|---|
| loop | 0.01 (1) | 3.8 |
| GPR | 30 | 3.6 (2) |
| final | 0.28 | 3.7 |

(1) $MFR_{10}$ was measured from the loop product, $MFR_2$ is calculated from this using an experimentally determined constant.

(2) MFR of the GPR product is estimated using the MFR of the loop product and the production split. The ethylene content of the product from GPR is estimated according to the ethylene content of the loop product and the final product.

Reference

Commercial unimodal random copolymer (XA30 21D, a product of Borealis) produced with a high yield stereospesific catalyst giving $MFR_2$=0.2 to 0.3 and ethylene content of 3.5 w %.

In table 1 are collected the pelletized copolymers from the examples 1 to 4 and the comparative example 1 and the reference.

The ethylene content values from the pelletized materials show small differencies compared to the powder samples in the examples. This is caused by the non-homogenity of the powder samples. The decrease in MFR (melt flow rate) of the pelletized samples is also generally seen for two phase material.

TABLE

| Example | 1 | 2 | 3 | 4 | Comp. 1 | Ref. |
|---|---|---|---|---|---|---|
| $MFR_2$, pellet | 0.18 | 0.22 | 0.15 | 0.15 | 0.10 | 0.25 |
| FRR = MFR10/MFR2 | 25 | 25 | 31 | 26 | 37 | 13 |
| Ethylene, w % | 2.9 | 3.5 | 3.4 | 3.3 | 3.7 | 3.5 |
| Rheology |  |  |  |  |  |  |
| SHI | 84 | 100 | 103 | 97 | 200 | 12 |
| PI | 6.6 | 7.1 | 7.6 | 7.5 | 11 | 2.6 |
| Elasticity index | 2830 | 3230 | 3260 | 3260 | 3830 | 1700 |
| Mechanical properties |  |  |  |  |  |  |
| Tensile strength, MPa | 24.9 | 24.1 | 23.9 | 24.2 | 23.2 | 23.4 |
| E-modulus, MPa | 960 | 840 | 870 | 880 | 800 | 760 |
| Charpy, notched, RT, kJ/m2 | 17 | 32 | 40 | 32 | 14 | 17 |
| Extrudability | ++ | ++ | ++ | ++ | ++ | -- |
| Pipe tests, 95° C. |  |  |  |  |  |  |
| 5 MPa, h | 740 | 59 | 5 | 230 | 2 | 1.5 |
| 4.5 MPa, h | 1050 | 400 | 1200 | 500 | 750 | 940 |
| 4.1 MPa, h | 1900 | 2180 | 2100 | 1920 | 1430 | 1590 |
| CTL, 60° C., 6.5 MPa, h | 340 |  |  |  |  | 240 |

Extrudability:
++ = smooth surface
-- = severe melt fracture, shark skin.
Mechanical tests from 4 mm compression moulded plaques. The specimens according to ISO 527.
Tensile strength according to ISO 527 (cross head speed = 50 mm/min),
E-modulus according to ISO 527 (cross head speed = 1 mm/min),
Charpy, notched impact according to ISO 179/1eA.
Pipe tests at 95 C. according to DIN 8078
The time to failure was measured at the given hoop stress levels.
CTL = constant tensile load test for slow crack growth in ESCR (environmental stress cracking resistance) media, 10% Igepal CO-630 (from GAF) at 60° C. The time to failure was measured at the given load level. The specimens are machined from 6 mm compression moulded plaques and notched with a razor blade. (The test is a Borealis method for slow crack growth of pipe materials).
Dynamic rheological measurements were performed by Rheometrics System IV rheometer in a frequency range between 0.01–400 Hz at 200° C.
Shear thinning index, SHI = $\eta_0/\eta$ (at shear stress G* = 100 000 Pa), where G* = $\eta \times \omega$, where $\eta$ is viscosity and $\omega$ is shear rate.
Elasticity index is defined as a value of dynamic storage modulus, G', when the loss modulus, G" is 5000 Pa
Polydispersity index (PI) is calculated from crossover modulus, $G_c$, PI = $10^5/G_c$

What is claimed is:
1. A composition of two propylene-α-olefin copolymers having a high molecular weight and a broad molecular weight distribution and an improved comonomer distribution wherein the composition is a mixture of copolymers prepared according to stages A) and B) which are as follows:
   A) propylene and a comonomer selected from the group consisting of ethylene, 1-butene, 1-hexene, 4-methyl-

1-pentene, 1-octene, 1-decene and combinations thereof, are copolymerized producing a higher molecular weight copolymer having a comonomer content of 3 to 10% by weight and a Mw of 2,000,000 to 4,000,000 and B) in one or several reactors propylene and said comonomer are added to the polymerization reaction including the copolymer from the stage A and the polymerization reaction is continued producing a lower molecular weight copolymer which is mixed with the higher molecular weight copolymer, and a final product composition having comonomer content of 2 to 10% by weight, and molecular weight distribution MWD of 6 to 15, is achieved and wherein the ratio between the copolymers having the higher molecular weight (A) and the lower molecular weight (B) is 40/60 to 70/30, wherein the higher molecular weight copolymer from stage (A) is produced with more comonomer then the lower molecular weight copolymer from stage (B).

2. A copolymer according to claim 1 wherein the comonomer is ethylene.

3. A copolymer according to claim 1 wherein the comonomer content in the higher-molecular weight copolymer is 4 to 6% by weight.

4. A process for the production of a propylene-α-olefin copolymer composition having a high molecular weight and a broad molecular weight distribution and an improved comonomer distribution wherein in stage A) propylene and a comonomer selected from the group consisting of ethylene, 1-butene, 1-hexene, 4-methyl-1-pentene, 1-octene, 1-decene and combinations thereof are copolymerized producing a higher molecular weight copolymer having comonomer content of 3 to 10% by weight and a Mw of 2,000,000 to 4,000,000 and in stage B) in one or several reactors propylene and said comonomer are added to the polymerization reaction including the copolymer from the stage A producing a lower molecular weight copolymer achieving a final product having a comonomer content of 2 to 10% by weight, and a molecular weight distribution, MWD, of 6 to 15, and in the final product the ratio between the copolymers having the higher molecular weight and the lower molecular weight is 40/60 to 70/30; wherein the higher molecular weight copolymer of stage A) is produced with more comonomer than the lower molecular weight copolymer of stage B).

5. A process according to claim 4 wherein in the Ziegler-Natta catalyst system the procatalyst comprises optionally prepolymerized $MgCl_2$ supported 4-valent Ti compound.

6. A process according to claim 4 wherein the first stage is carried out in a slurry.

7. A process according to claim 4 wherein the first stage is carried out in a gas phase reactor.

8. A process according to claim 6, wherein the slurry comprises a monomer slurry.

9. A process according to claim 6, wherein the slurry comprises an inert diluent slurry.

10. A process according to claim 7, wherein said reactor comprises a fluidized bed reactor.

11. An article of manufacture wherein said article is prepared with the copolymer according to claim 1 and is made by blow molding the same or by preparing a film of said copolymer or a foam or a fiber composed of said copolymer or a foam or a fiber composed of said copolymer.

12. An article of manufacture wherein said article is composed of the copolymer according to claim 1 formed as a pipe, a fitting or a profile.

13. A method of fashioning an article according to claim 11 wherein said article is prepared by a blow molding process or a film forming process or a foam or fiber preparation.

14. An article of manufacture according to claim 12 wherein the copolymer according to claim 1 is formed into a pipe, fitting or profile composed of the copolymer according to claim 1.

15. A copolymer according to claim 1, wherein the higher molecular weight (A) has a comonomer content of 3.7 to 6 weight percent and lower molecular weight (B) has a comonomer content of 2 to 3 weight percent.

16. A copolymer according to claim 4, wherein the higher molecular weight copolymer of stage A) has a comonomer content of 3.7 to 6 weight percent and the lower molecular weight copolymer of stage B) has a comonomer content of 2–3 weight percent.

* * * * *